Patented Dec. 14, 1926.

1,610,539

UNITED STATES PATENT OFFICE.

HERMANN WAGNER, OF SODEN AM TAUNUS, RUDOLF BRUNE, OF HOCHST-ON-THE-MAIN, MAX HESSENLAND, OF KOENIGSBERG, AND ERWIN HOFFA AND FRITZ MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

VAT DYES AND PROCESS OF PRODUCING THE SAME.

No Drawing. Application filed May 3, 1926, Serial No. 106,491, and in Germany May 6, 1925.

Our present invention relates to the preparation of new vat dyestuffs.

Most of the thioindigo dyestuffs are deficient as regards their fastness to light and kier-boiling.

Now we have found that vat dyestuffs are obtained, which entirely satisfy the above mentioned requirements as to fastness, by converting the 3-methyl-4-5-dihalogenphenyl-1-thioglycollic acid, or thioglycollic acids containing in their 2-position a further carboxyl-, $C-ONH_2-$ or nitrile group, by one of the usual methods first into the corresponding oxythio-naphthene, the 4-methyl-5.6-dihalogenoxythionaphthene and then further by oxidation into the thioindigo, dyestuffs, namely the 4.4'-dimethyl-5.6.5'6'-tetrahalogenthioindigos.

The following examples serve to illustrate our invention, the parts being by weight:

(1.) 40 parts of 3-methyl-4.5-dichlorophenyl-1-thioglycol-2-carboxylic acid nitrile are dissolved together with 1250 parts of water, 20 parts of caustic soda solution and 5 parts of sodium sulfide. When the mixture is dissolved, a further quantity of 180 parts of caustic soda solution is added thereto and the whole is stirred at 80–85° for two hours. Immediately on heating this solution, separation of the sodium salt of the 3-amino-1-thionapthene-2-carboxylic acid sets in and is almost complete after addition of 100 parts of common salt and cooling. After having filtered the mass by suction and washed it with a solution of common salt the resulting moist paste is dissolved in 20 times the quantity of water while adding some caustic soda solution and bisulfite; the solution thus obtained is filtered, and the filtrate acidified with diluted hydrochloric acid and warmed on the water bath until the formation of the oxythionaphthene is complete. The latter when cool is filtered by suction, washed and, if required, dried. It has a melting point of 157° C. In order to convert this product into the dyestuff, 20 parts of the oxythionaphthene are dissolved in 50 parts of alcohol and 115 parts of caustic soda solution of 40° Bé.; the resulting solution is slowly run, while stirring, into a solution heated to 70° of 100 parts of copper sulfate in 1000 parts of water whereupon a strong current of air is passed in the heat through the liquid for several hours. When the formation of the coloring matter is complete, 80 parts of sulfuric acid of 60° Bé. are added and the whole is heated further for some hours while again blowing air through it. Finally the dyestuff is filtered off and washed until it gives a neutral reaction.

The 4.4'-dimethyl-5.6.5'6'-tetrachlorobisthionapthene indigo forms a bluish-red powder which is soluble in sulfuric acid to a green solution. The vat prepared from the dyestuff shows a golden-yellow color, it is wholly absorbed by the fibre and dyes cotton very bright, bluish-red tints, which are remarkable for their extremely good properties as to fastness.

In an analogous manner, the corresponding 3-methyl-4-bromo-5-chlorophenyl-1-thioglycol-2-carboxylic acid nitrile may be converted into thioindigo. The shade obtainable by this dyestuff and its properties resemble those of the dyestuff obtainable according to the above example.

(2.) 15 parts of 3-methyl-4.5-dichlorophenyl-1-thioglycollic acid are introduced at 5° C., while stirring into 150 parts of chlorosulfonic acid and stirred for a prolonged time at the said temperature. During this operation the thioglycollic acid dissolves to a brown-yellow solution which, when chlorosulfonic acid acts upon it for a prolonged time, assumes a green color. In order to complete the oxidation, the mass is heated further for some hours to 30° C. and then poured on ice-water. The dye-stuff separating as bluish-red flakes is filtered by suction and washed until neutral. Thus the 4.4'-dimethyl - 5.6.5'6' - tetrachlorobisthionaphthene indigo is obtained.

The parent material may be prepared by subjecting the hydrochloride of 6-chloro-2-toluidine to the reactions, described in German patent specifications No. 360690 and No. 364822, and de-amidizing the 2-amino-3-methyl - 4.5-dichlorophenyl-1-thioglycollic acid thus obtained.

We claim:
1. Process of producing vat dyes consisting in condensing to the corresponding oxy- thionaphthenes an arylthioglycollic acid of the following formula:

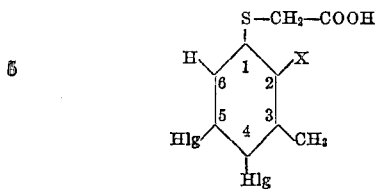

wherein X represents hydrogen, a carboxyl group or nitrile or the residue

and then oxidizing the product so obtained.

2. As new products, vat dyes of the following formula:

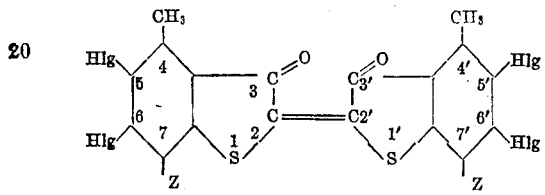

wherein Hlg represents halogen, Z=hydrogen or any substituent.

3. As a new product 4.4'-dimethyl-5.6.5'6'-tetrachlorothioindigo of the following composition:

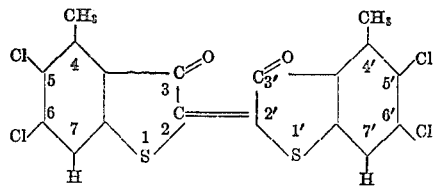

being a bluish-red powder, soluble in concentrated sulfuric acid with a green color, forming a golden-yellow vat from which cotton is dyed a very bright bluish-red tint.

In testimony whereof, we affix our signatures.

HERMANN WAGNER.
RUDOLF BRUNE.
MAX HESSENLAND.
ERWIN HOFFA.
FRITZ MÜLLER.